(12) United States Patent
Yamayoshi et al.

(10) Patent No.: US 11,090,749 B2
(45) Date of Patent: Aug. 17, 2021

(54) ALUMINUM ALLOY BRAZING SHEET, METHOD FOR MANUFACTURING THE SAME, ALUMINUM ALLOY SHEET, AND HEAT EXCHANGER

(71) Applicant: UACJ Corporation, Tokyo (JP)

(72) Inventors: Tomoki Yamayoshi, Tokyo (JP); Atsushi Fukumoto, Tokyo (JP)

(73) Assignee: UACJ CORPORATION, Tokyo (JP)

( * ) Notice: Subject to any disclaimer, the term of this patent is extended or adjusted under 35 U.S.C. 154(b) by 224 days.

(21) Appl. No.: 15/768,686

(22) PCT Filed: Oct. 13, 2016

(86) PCT No.: PCT/JP2016/080291
§ 371 (c)(1),
(2) Date: Apr. 16, 2018

(87) PCT Pub. No.: WO2017/065190
PCT Pub. Date: Apr. 20, 2017

(65) Prior Publication Data
US 2018/0297138 A1    Oct. 18, 2018

(30) Foreign Application Priority Data
Oct. 16, 2015   (JP) .............................. JP2015-204380

(51) Int. Cl.
*B23K 1/00*      (2006.01)
*B23K 35/02*     (2006.01)
(Continued)

(52) U.S. Cl.
CPC ............ *B23K 1/0012* (2013.01); *B23K 1/008* (2013.01); *B23K 1/19* (2013.01); *B23K 20/04* (2013.01);
(Continued)

(58) Field of Classification Search
None
See application file for complete search history.

(56) References Cited

FOREIGN PATENT DOCUMENTS

CN       1882407 A      12/2006
EP     1 430 988 A1      6/2004
(Continued)

OTHER PUBLICATIONS

Extended (Supplementary) Search Report dated Mar. 8, 2019, issued in counterpart EP Application No. 16855443.4 (12 pages).
(Continued)

*Primary Examiner* — Devang R Patel
(74) *Attorney, Agent, or Firm* — Westerman, Hattori, Daniels & Adrian, LLP

(57) ABSTRACT

An aluminum alloy brazing sheet used for brazing in an inert gas atmosphere without using flux includes a core material of aluminum or aluminum alloy, and a brazing material of aluminum alloy including Si of 4.0 mass % to 13.0 mass % and cladding one side surface or both side surfaces of the core material. One or both of the core material and the brazing material includes any one or two or more types of X atoms (X is Mg, Li, Be, Ca, Ce, La, Y, and Zr). The aluminum alloy brazing sheet is a brazing sheet in which oxide particles including the X atoms and having a volume change ratio of 0.99 or lower with respect to an oxide film before brazing heating are formed on a surface thereof, by brazing heating.

6 Claims, 1 Drawing Sheet

(51) Int. Cl.
    *C22C 21/02*    (2006.01)
    *C22C 21/00*    (2006.01)
    *B23K 1/19*     (2006.01)
    *B23K 20/04*    (2006.01)
    *B32B 15/01*    (2006.01)
    *B23K 35/28*    (2006.01)
    *C22C 21/04*    (2006.01)
    *C22F 1/047*    (2006.01)
    *C22F 1/04*     (2006.01)
    *C22F 1/053*    (2006.01)
    *B23K 20/233*   (2006.01)
    *B23K 1/008*    (2006.01)
    *C22F 1/043*    (2006.01)
    *B23K 20/24*    (2006.01)
    *F28F 21/08*    (2006.01)
    *B23K 103/10*   (2006.01)
    *B23K 101/14*   (2006.01)

(52) U.S. Cl.
    CPC .......... *B23K 20/2336* (2013.01); *B23K 20/24* (2013.01); *B23K 35/0233* (2013.01); *B23K 35/0238* (2013.01); *B23K 35/286* (2013.01); *B23K 35/288* (2013.01); *B32B 15/016* (2013.01); *C22C 21/00* (2013.01); *C22C 21/02* (2013.01); *C22C 21/04* (2013.01); *C22F 1/04* (2013.01); *C22F 1/043* (2013.01); *C22F 1/047* (2013.01); *C22F 1/053* (2013.01); *F28F 21/084* (2013.01); *B23K 2101/14* (2018.08); *B23K 2103/10* (2018.08); *F28F 2245/00* (2013.01); *F28F 2275/04* (2013.01)

(56) References Cited

FOREIGN PATENT DOCUMENTS

| | | | |
|---|---|---|---|
| EP | 2 848 354 A1 | 3/2015 | |
| EP | 2848354 A1 * | 3/2015 | ............ B23K 1/012 |
| EP | 3 176 273 A1 | 6/2017 | |
| EP | 3 231 545 A1 | 10/2017 | |
| JP | 11-285817 A | 10/1999 | |
| JP | 2004-358519 A | 12/2004 | |
| JP | 2013-123749 A | 6/2013 | |
| JP | 2013-215797 A | 10/2013 | |
| JP | 2013-220436 A | 10/2013 | |
| JP | 2013220436 A * | 10/2013 | |
| JP | 2013-233552 A | 11/2013 | |
| JP | 2014-73519 A | 4/2014 | |
| JP | 2015-21158 A | 2/2015 | |

OTHER PUBLICATIONS

Yamayoshi et al., "Destruction mechanism of the oxide film in brazing sheet for fluxless", The Japan Institute of Light Metals Dai 128 Kai Shunki Taikai Koen Gaiyo, Apr. 16, 2015, pp. 91-92, cited in ISR (6 pages total, including English translation).

International Search Report dated Dec. 27, 2016, issued in counterpart International Application No. PCT/JP2016/080291 (2 pages).

Office Action dated Dec. 4, 2019, issued in counterpart CN Application No. 201680060575.X, with English translation (24 pages).

Office Action dated Feb. 3, 2021, issued in counterpart CN Application No. 201680060575.X, with English translation (24 pages).

* cited by examiner

ALUMINUM ALLOY BRAZING SHEET, METHOD FOR MANUFACTURING THE SAME, ALUMINUM ALLOY SHEET, AND HEAT EXCHANGER

TECHNICAL FIELD

The present invention relates to an aluminum alloy brazing sheet and a method for manufacturing the same, used for brazing aluminum or aluminum alloy in an inert gas atmosphere without using flux, an aluminum alloy sheet obtained by performing brazing heating using the same, and a heat exchanger.

BACKGROUND ART

Braze jointing is widely used as a method for joining aluminum products including a number of joined portions, such as aluminum heat exchangers and/or mechanical components. Braze jointing of aluminum or aluminum alloy indispensably requires breaking an oxide film covering the surface thereof, to expose the molten brazing material, and cause it to get wet with the base metal or the brazing material molten in the same manner. Examples of a method for breaking an oxide film are broadly divided into methods using flux in a nitrogen gas furnace, and methods using no flux in a vacuum heating furnace, and both of them have been put to practical use.

In the method using flux in a nitrogen gas furnace, flux reacts with an oxide film during brazing heating, and breaks the oxide film. However, the method has the problem of increase in cost of the flux and cost of the process of applying the flux. In addition, the method includes risk of occurrence of inferior brazing, when the flux is unevenly applied. By contrast, in the method using no flux in a vacuum heating furnace, a brazing material formed of Al—Si—Mg based alloy is used, and Mg in the brazing material is vaporized by heating in vacuum, to break the oxide film on the surface of the material. However, the method has a weak point that the method requires an expensive vacuum heating equipment. The method also has the problem of requiring high maintenance cost to remove Mg adhering to the inside of the furnace, because the vaporized Mg adheres to the inside of the furnace. For these reasons, there are increasing needs of performing joining in a nitrogen gas furnace without using flux.

To satisfy the needs, for example, Patent Literature 1 presents a structure of including Mg in a brazing material, to enable surface joining. Patent Literature 2 presents a structure of including Mg in a core material, and diffusing Mg into a brazing material during brazing heating, to enable formation of a fillet with a simple fin/tube joint. However, these methods do not enable formation of a sufficient fillet without application of flux, in a practical joint having a clearance. Specifically, in these methods, the oxide film is divided into particles with Mg, and thereafter a newly formed surface of the molten brazing material is exposed by an external force due to the difference in the thermal expansion between the molten brazing material and the oxide film, flow of the brazing material, or the like to cause wetting. For this reason, these methods cause formation of a distorted fillet in a practical joint. To form a uniform fillet also in a practical joint, it is necessary to expose a newly formed surface of the molten brazing material on the whole surface of the brazing material.

Patent Literature 1 also presents that it is effective to suppress the thickness of an MgO film existing on an oxide film before brazing heating. However, in Patent Literature 1 with the structure of including Mg of 0.1% or more in the brazing material, an MgO-based film is partly formed during brazing heating in a practical joint, and obstructs formation of a fillet, to cause break of the fillet. By contrast, Patent Literature 3 presents a method in which pickling is performed on a brazing material including Mg of 0.05% or more before brazing heating, to remove a MgO-based film and enable brazing without using flux. However, this method is not capable of sufficiently suppressing formation of an MgO-based film in brazing heating as in Patent Literature 1.

PRIOR ART LITERATURES

Patent Literatures

[Patent Literature 1] Japanese Patent Publication 2013-215797-A
[Patent Literature 2] Japanese Patent Publication 2004-358519-A
[Patent Literature 3] Japanese Patent Publication 11-285817-A

DISCLOSURE OF THE INVENTION

Problems to be Solved by the Invention

The present invention has been made to solve the problem described above. An object of the present invention is to provide an aluminum alloy brazing sheet and a method for manufacturing the same, with excellent brazability in brazing in an inert gas atmosphere without using flux.

Means for Solving the Problems

The object described above is achieved with the present invention as follows.

Specifically, the present invention (1) is an aluminum alloy brazing sheet used for brazing in an inert gas atmosphere without using flux, the aluminum alloy brazing sheet including:

a core material of aluminum or aluminum alloy; and a brazing material of aluminum alloy including Si of 4.0 mass % to 13.0 mass % and cladding one side surface or both side surfaces of the core material, in which one or both of the core material and the brazing material includes any one or two or more types of X atoms (X is Mg, Li, Be, Ca, Ce, La, Y, and Zr), when only the core material includes the X atoms, the content of each of the X atoms in the core material is 0.01 mass % to 2.0 mass %, when only the brazing material includes the X atoms, the content of each of the X atoms in the brazing material is 0.001 mass % to 0.03 mass %, when both the core material and the brazing material include the X atoms, the content of each of the X atoms in the core material is 0.01 mass % to 2.0 mass %, and the content of each of the X atoms in the brazing material is 0.001 mass % to 0.03 mass %, and the aluminum alloy brazing sheet is a brazing sheet in which oxide particles including the X atoms and having a volume change ratio of 0.99 or lower with respect to an oxide film before brazing heating are formed on a surface thereof, by brazing heating.

In addition, the present invention (2) is a method for manufacturing an aluminum alloy brazing sheet, the method including:

superposing a core material and a brazing material, or superposing a core material, a brazing material, and a sacrificial anode material; and performing hot rolling and cold rolling to obtain a brazing sheet, in which intermediate annealing or final annealing is performed during manufacturing process, the core material is formed of aluminum or aluminum alloy, the brazing material is formed of aluminum alloy including Si of 4.0 mass % to 13.0 mass %, one or both of the core material and the brazing material includes any one or two or more types of X atoms (X is Mg, Li, Be, Ca, Ce, La, Y, and Zr), when only the core material includes the X atoms, the content of each of the X atoms in the core material is 0.01 mass % to 2.0 mass %, when only the brazing material includes the X atoms, the content of each of the X atoms in the brazing material is 0.001 mass % to 0.03 mass %, when both the core material and the brazing material include the X atoms, the content of each of the X atoms in the core material is 0.01 mass % to 2.0 mass %, and the content of each of the X atoms in the brazing material is 0.001 mass % to 0.03 mass %, and in the intermediate annealing or final annealing performed during the manufacturing process, the intermediate annealing or final annealing is performed by performing heating at 250° C. to 450° C. in an atmosphere with an oxygen concentration controlled to 1,000 ppm or lower and a dew point controlled to −20° C. or lower, and subsequently removing the material from a furnace at 250° C. or lower.

In addition, the present invention (3) is an aluminum alloy sheet obtained by subjecting the aluminum alloy brazing sheet of (1) to brazing heating in an inert gas atmosphere without using flux, in which oxide particles including the X atoms and having a volume change ratio of 0.99 or lower with respect to an oxide film of the aluminum alloy brazing sheet before brazing heating are formed on a surface of the aluminum alloy sheet.

In addition, the present invention (4) is a heat exchanger obtained by subjecting the aluminum alloy brazing sheet of (1) to brazing heating in an inert gas atmosphere without using flux, in which oxide particles including the X atoms and having a volume change ratio of 0.99 or lower with respect to an oxide film of the aluminum alloy brazing sheet before brazing heating are formed on a surface of an aluminum alloy sheet after being subjected to brazing heating in the heat exchanger.

Effects of the Invention

The present invention provides an aluminum alloy brazing sheet and a method for manufacturing the same, with excellent brazability in brazing in an inert gas atmosphere without using flux.

EMBODIMENTS

Figure 1:
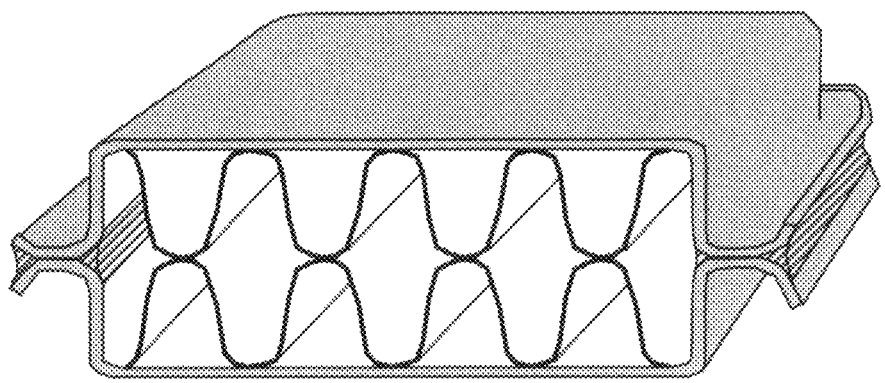
FIG. 1 is a diagram illustrating assembly of a cup test piece in examples and comparative examples.

An aluminum alloy brazing sheet according to the present invention is an aluminum alloy brazing sheet used for brazing in an inert gas atmosphere without using flux, including:

a core material of aluminum or aluminum alloy; and a brazing material of aluminum alloy including Si of 4.0 mass % to 13.0 mass % and cladding one side surface or both side surfaces of the core material, in which one or both of the core material and the brazing material includes any one or two or more types of X atoms (X is Mg, Li, Be, Ca, Ce, La, Y, and Zr), when only the core material includes the X atoms, the content of each of the X atoms in the core material is 0.01 mass % to 2.0 mass %, when only the brazing material includes the X atoms, the content of each of the X atoms in the brazing material is 0.001 mass % to 0.03 mass %, when both the core material and the brazing material include the X atoms, the content of each of the X atoms in the core material is 0.01 mass % to 2.0 mass %, and the content of each of the X atoms in the brazing material is 0.001 mass % to 0.03 mass %, and the aluminum alloy brazing sheet is a brazing sheet in which oxide particles including the X atoms and having a volume change ratio of 0.99 or lower with respect to an oxide film before brazing heating are formed on a surface thereof, by brazing heating.

The aluminum alloy brazing sheet according to the present invention is an aluminum alloy brazing sheet used for brazing in which brazing heating is performed in an inert gas atmosphere without using flux, to braze aluminum or aluminum alloy.

The aluminum alloy brazing sheet according to the present invention is formed of a core material formed of aluminum or aluminum alloy, and a brazing material formed of aluminum alloy and cladding one side surface or both side surfaces of the core material.

The aluminum alloy brazing sheet according to the present invention has a structure in which any one of or both of the core material and the brazing material includes one or two or more types of X atoms (X is Mg, Li, Be, Ca, Ce, La, Y, and Zr). Specifically, the aluminum alloy brazing sheet according to the present invention includes: (A) the form in which only the core material includes X atoms; (B) the form in which only the brazing material includes X atoms; and (C) the form in which both of the core material and the brazing material include X atoms. In the present invention, X atoms are a general term for Mg, Li, Be, Ca, Ce, La, Y, and Zr, and indicates one or two or more types of these atoms.

The X atoms break an oxide film formed on the surface of the brazing material during brazing heating, to effectively expose a newly formed surface of the molten brazing material. Because the X atoms have oxide producing energy smaller than that of Al, the X atoms deoxidizes the oxide film mainly including Al during brazing heating, and forms a particulate oxide including X atoms.

The aluminum alloy brazing sheet according to the present invention is an aluminum alloy brazing sheet in which oxide particles including X atoms and having a volume change ratio of 0.99 or lower, preferably 0.70 to 0.97, and particularly preferably 0.70 to 0.95, with respect to an oxide film formed on the surface of the brazing material before brazing are formed on the surface of the brazing material, by brazing heating in an inert gas atmosphere without using flux. In brazing heating in an inert gas atmosphere without using flux, a particulate oxide including X atoms and having the volume change ratio falling within the range described above with respect to an oxide film formed on the surface of the brazing material before brazing is formed. This structure enables effective exposure of a newly formed surface of the brazing material in brazing heating, and provides the aluminum alloy brazing sheet with excellent brazability. By contrast, in brazing heating in an inert gas atmosphere without using flux, when the volume change ratio of the oxide formed on the surface of the brazing material with respect to the oxide film formed on the surface of the brazing material before brazing becomes larger than the range described above, exposure of a newly formed surface of the brazing material becomes difficult in brazing heating. In the present invention, the volume change ratio of oxide particles including X atoms and formed by brazing heating is volume change ratio with respect to the oxide film formed on the surface of the brazing material before brazing, and is a value obtained with the expression "volume per oxygen atom of oxide particles including X atoms and formed by brazing heating/volume per oxygen atom of the oxide film formed on the surface of the brazing material before brazing". In the expression, the volume per oxygen atom is calculated by dividing the molecular weight of the oxide by density of the oxide.

The X atoms (X is Mg, Li, Be, Ce, La, Y, and Zr) are contained atoms effective for exposing a newly formed surface of the brazing material in brazing heating, in brazing heating in an inert gas atmosphere without using flux, because the X atoms has oxide producing free energy smaller than that of Al and is capable of not only deoxidizing the oxide film, but also forming an oxide with volume change ratio of 0.99 or lower. For example, MgO has the volume change ratio of 0.994, while $MgAl_2O_4$ has the volume change ratio of 0.863 that is smaller than 0.99. By contrast, Ba, Th, Nd, and the like are not effective contained atoms, because they have no oxides with the volume change ratio of 0.99 or lower, although they are atoms having oxide producing free energy smaller than that of Al. For example, the volume change ratio of BaO serving as an oxide including Ba is 2.366, the volume change ratio of $BaAl_2O_4$ serving as an oxide including Ba is 1.377, and Ba has no oxides with volume change ratio of 0.99 or lower. Examples of oxides having oxide producing free energy smaller than that of Al and forming an oxide with the volume change ratio of 0.99 or lower include $LiAl_5O_8$ (volume change ratio=0.822), $BeAl_2O_4$ (0.763), $CaAl_{12}O_{19}$ (0.967), $CeAlO_3$ (0.957), $LaAlO_3$ (0.965), $ZrO_2$ (0.947), and $Y_3Al_5O_{12}$ (0.960), in addition to $MgAl_2O_4$.

The aluminum alloy brazing sheet according to the present invention has the structure: (A) in the form in which only the core material includes X atoms, the content of each of the X atoms in the core material is 0.01 mass % to 2.0 mass %, and preferably 0.1 mass % to 1.8 mass %; (B) in the form in which only the brazing material includes X atoms, the content of each of the X atoms in the brazing material is 0.001 mass % to 0.03 mass %, and preferably 0.005 mass % to 0.025 mass %; and (C) in the form in which both the core material and the brazing material include X atoms, the content of each of the X atoms in the core material is 0.01 mass % to 2.0 mass %, and preferably 0.1 mass % to 1.8 mass %, and the content of each of the X atoms in the brazing material is 0.001 mass % to 0.03 mass %, and preferably 0.005 mass % to 0.025 mass %. When the content of each of the X atoms in the brazing material is smaller than the range described above, the effect of breaking the oxide film with the X atoms becomes poor. When the content of each of the X atoms in the brazing material exceeds the range described above, the X atoms are oxidized during brazing heating, to form an oxide with the volume change ratio exceeding 0.99. When the content of the X atoms in the core material is smaller than the range described above, diffusion of the X atoms into the brazing material becomes insufficient, and the effect of breaking the oxide film becomes poor. When the content of the X atoms in the core material exceeds the range described above, the melting point of the core material is lowered too much, and local melting is caused in the core material in brazing heating. This causes deformation of the core material, and corrosion on the core material with the molten brazing material, and lowers the braze jointing property and the corrosion resistance. The expression "the content of each of the X atoms" in the core material and the brazing material means the content of X atoms of one type, when the core material or the brazing material includes only one type of X atoms, and means the content of each type of two or more types of X atoms, when the core material or the brazing material includes two or more types of X atoms.

The core material may be formed of aluminum (inevitable impurities may be included), or aluminum alloy including certain atoms with the balance being Al and inevitable impurities.

The aluminum alloy relating to the core material is aluminum alloy including X atoms with a content of each of the X atoms of 2.0 mass % or lower, and one or two or more types of Mn of 1.8 mass % or lower, Si of 1.2 mass % or lower, Fe of 1.0 mass % or lower, Cu of 1.5 mass % or lower, Zn of 3.0 mass % or lower, and Ti of 0.2 mass % or lower, with the balance being Al and inevitable impurities. In the form of (A) or (C), that is, in the form in which only the core material includes X atoms or the form in which both the core material and the brazing material include X atoms, the content of each of the X atoms in the aluminum alloy relating to the core material is 0.01 mass % to 2.0 mass %, and preferably 0.1 mass % to 1.8 mass %. In the form of (B), that is, in the form in which only the brazing material includes X atoms, the content of each of the X atoms in the aluminum alloy relating to the core material is 0 mass %.

In the aluminum alloy forming the core material, Mn effectively functions to improve the strength and regulate the potential. When the core material includes Mn, the Mn content in the core material is 1.8 mass % or lower. When the Mn content in the core material exceeds 1.8 mass %, cracks easily occur in rolling of the material. The Mn content in the core material is preferably 0.3 mass % or more, in the point that the effect of improvement in strength can be easily obtained.

In the aluminum alloy forming the core material, Si functions to improve the strength. When the core material includes Si, the Si content in the core material is 1.2 mass % or lower. When the Si content in the core material exceeds 1.2 mass %, the melting point becomes too low. This causes local melting in brazing, and deformation of the core material, and lowers corrosion resistance. In addition, the Si content in the core material is preferably 0.1 mass % or more, in the point that the effect of improvement in strength can be easily obtained.

In the aluminum alloy forming the core material, Fe functions to improve the strength. When the core material includes Fe, the Fe content in the core material is 1.0 mass % or lower. When the Fe content in the core material exceeds 1.0 mass %, the corrosion resistance is lowered, and giant compounds easily occur. The Fe content in the core material is preferably 0.1 mass % or more, in the point that the effect of improvement in strength can be easily obtained.

In the aluminum alloy forming the core material, Cu functions to improve the strength and regulate the potential. When the core material includes Cu, the Cu content in the core material is 1.5 mass % or lower. When the Cu content in the core material exceeds 1.5 mass %, the intergranular corrosion easily occurs, and the melting point becomes too low. In addition, the Cu content in the core material is preferably 0.05 mass % or more, in the point that the effect of improvement in strength can be easily obtained.

In the aluminum alloy forming the core material, Zn functions to regulate the potential. When the core material includes Zn, the Zn content in the core material is 3.0 mass % or lower. When the Zn content in the core material exceeds 3.0 mass %, the natural electrode potential becomes too low, and the perforation corrosion life is shortened. The Zn content in the core material is preferably 0.1 mass % or more, in the point that the effect of regulation of the potential can be easily obtained.

In the aluminum alloy forming the core material, Ti functions to cause corrosion to progress in a layered manner. When the core material includes Ti, the Ti content in the core material is 0.2 mass % or lower. When the Ti content in the core material exceeds 0.2 mass %, giant compounds easily occur, and the rolling property and corrosion resistance deteriorate. In addition, the Ti content in the core material is preferably 0.06 mass % or more, in the point that the exfoliation corrosion effect can be easily obtained.

The aluminum alloy relating to the brazing material is aluminum alloy including Si of 4.0 mass % to 13.0 mass %, X atoms with a content of each of the X atoms of 0.03 mass % or lower, and Bi of 0.2 mass % or lower, with the balance being Al and inevitable impurities. In the form of (A), that is, in the form in which only the core material includes X atoms, the content of each of the X atoms in the aluminum alloy relating to the brazing material is 0 mass %. In the form of (B) or (C), that is, in the form in which only the brazing material includes X atoms or the form in which both the core material and the brazing material include X atoms, the content of each of the X atoms in the aluminum alloy relating to the brazing material is 0.001 mass % to 0.03 mass %.

The brazing material includes Si of 4.0 mass % to 13.0 mass %. When the Si content in the brazing material is smaller than the range described above, the brazability deteriorates. When the Si content in the brazing material exceeds the range described above, cracks easily occur in manufacturing of the material, and causes difficulty in manufacturing of the brazing sheet.

In the aluminum alloy forming the brazing material, Fe is an inevitable impurity existing in aluminum metal, and does not obstruct the effect of the present invention, as long as the Fe content is 0.8 mass % or lower. Although aluminum metal with a low Fe content exists, use of metal with high purity increases the cost. In addition, in consideration of recycle of aluminum scraps collected from the domestic market, a Fe content of 0.8 mass % or lower is acceptable.

The aluminum alloy forming the brazing material, Bi effectively functions to decrease the surface tension of Al—Si molten brazing material. When the brazing material includes Bi, the Bi content in the brazing material is 0.2 mass % or lower. When the Bi content in the brazing material exceeds 0.2 mass %, both the surfaces of the brazing material after brazing is blackened, and the brazability decreases. The Bi content in the brazing material is preferably 0.004 mass % or more, in the point that the effect of reducing the surface tension can be easily obtained.

An oxide film is formed on the surface of the brazing material of the aluminum alloy brazing sheet according to the present invention. The molar ratio of each of the X atoms in the oxide film formed on the surface of the brazing material of the aluminum alloy brazing sheet according to the present invention with respect to Al in terms of atoms is preferably 0.2 or lower. Because the molar ratio (X atoms/Al) of each of the X atoms of the oxide film formed on the surface of the brazing material with respect to Al, in terms of atoms, falls within the range described above, the volume change ratio of the oxide formed by brazing heating and including X atoms with respect to the oxide film formed on the surface of the brazing material before brazing is easily set to 0.99 or lower. When the oxide film formed on the surface of the brazing material of the aluminum alloy brazing sheet according to the present invention includes two or more types of X atoms, the expression "the molar ratio of each of the X atoms with respect to Al in terms of atoms is 0.2 or lower" means that the molar ratio of each of types of X atoms with respect to Al in terms of atoms is 0.2 or lower.

The thickness of the oxide film formed on the surface of the brazing material of the aluminum alloy brazing sheet according to the present invention is preferably 30 nm or less, to easily break the oxide film. When the thickness of the oxide film formed on the surface of the brazing material exceeds 30 nm, breakage of the oxide film does not easily progress.

The aluminum alloy brazing sheet according to the present invention may be a brazing sheet in which the brazing material dads one side of the core material, and a sacrificial anode material clads the other side of the core material. The sacrificial anode material provides corrosion resistance to the sacrificial anode material side, and is formed of aluminum alloy including Zn of 0.9 mass % to 6.0 mass % with the balance being Al and inevitable impurities. When the Zn content in the aluminum alloy relating to the sacrificial anode material is smaller than the range described above, the corrosion-resistant effect becomes insufficient. When the Zn content exceeds the range, corrosion is promoted, and the perforation corrosion life is shortened.

The aluminum alloy brazing sheet according to the present invention is obtained by superposing a core material and a brazing material including a predetermined additive component, or superposing a core material, a brazing material, and a sacrificial anode material including a predetermined additive component, forming a laminated material by hot rolling, thereafter processing the laminated material to a thickness of approximately 2 to 3 mm by hot rolling, and processing the laminated material to a thickness of approximately 1 to 2 mm when the material is thick, to a thickness of approximately 0.05 mm when the material is thin. During the manufacturing process, intermediate annealing or final annealing is performed.

In manufacturing of the aluminum alloy brazing sheet according to the present invention, growth of the oxide film and concentration of X atoms to the oxide film are preferably suppressed, in the manufacturing process. Specifically, a preferable form of the method for manufacturing the aluminum alloy brazing sheet according to the present invention is a method including superposing a core material and a brazing material, or superposing a core material, a brazing material, and a sacrificial anode material, and performing rolling by hot rolling and cold rolling to obtain a brazing sheet, in which intermediate annealing or final annealing is performed during the manufacturing process, the core material is formed of aluminum or aluminum alloy, the brazing material is formed of aluminum alloy including Si of 4.0 mass % to 13.0 mass %, one or both of the core material and the brazing material include one or two or more types of X atoms (X is Mg, Li, Be, Ca, Ce, La, Y, and Zr), the content of each of the X atoms in the core material is 0.01 mass % to 2.0 mass %, when only the core material includes the X atoms;

the content of each of the X atoms in the brazing material is 0.001 mass % to 0.03 mass %, when only the brazing material includes the X atoms;

the content of each of the X atoms in the core material is 0.01 mass % to 2.0 mass %, and the content of each of the X atoms in the brazing material is 0.001 mass % to 0.03 mass %, when both the core material and the brazing material include the X atoms;

in intermediate annealing or final annealing performed during the manufacturing process, the intermediate annealing or final annealing is performed by heating the material at 250° C. to 450° C. in an atmosphere with an oxygen concentration controlled to 1,000 ppm or lower and a dew point controlled to −20° C. or lower, and subsequently removing the material from a furnace at 250° C. or lower.

In the method for manufacturing the aluminum alloy brazing sheet according to the present invention, the type and the contents of the additive components in the core material, the brazing material, and the sacrificial anode material superposed before hot rolling are the same as the components and the contents thereof in the core material, the brazing material, and the sacrificial anode material relating to the aluminum alloy brazing sheet according to the present invention.

Specifically, the core material is formed of aluminum alloy including X atoms with a content of each of the X atoms of 2.0 mass % or lower, and one or two or more types of Mn of 1.8 mass % or lower, and preferably 0.3 mass % to 1.8 mass %, Si of 1.2 mass % or lower, and preferably 0.1 mass % to 1.2 mass %, Fe of 1.0 mass % or lower, and preferably 0.1 mass % to 1.0 mass %, Cu of 1.5 mass % or lower, and preferably 0.05 mass % to 1.5 mass %, Zn of 3.0 mass % or lower, and preferably 0.1 mass % to 3.0 mass %, and Ti of 0.2 mass % or lower, and preferably 0.06 mass % to 0.2 mass %, with the balance being Al and inevitable impurities. In the form in which only the core material includes X atoms or the form in which both the core material and the brazing material include X atoms, the content of each of the X atoms in the aluminum alloy relating to the core material is 0.01 mass % to 2.0 mass %, and preferably 0.1 mass % to 1.8 mass %. In the form in which only the brazing material includes X atoms, the content of each of the X atoms in the aluminum alloy relating to the core material is 0 mass %.

The brazing material is formed of aluminum alloy including Si of 4.0 mass % to 13.0 mass %, X atoms with a content of each of the X atoms of 0.03 mass % or lower, and, if necessary, Bi of 0.2 mass % or lower, and preferably 0.004 mass % to 0.2 mass %, with the balance being Al and inevitable impurities. In the form in which only the core material includes X atoms, the content of each of the X atoms in the aluminum alloy relating to the brazing material is 0 mass %. In the form in which only the brazing material includes X atoms or the form in which both the core material and the brazing material include X atoms, the content of each of the X atoms in the aluminum alloy relating to the brazing material is 0.001 mass % to 0.03 mass %, and preferably 0.005 mass % to 0.025 mass %.

In the method for manufacturing the aluminum alloy brazing sheet according to the present invention, a core material and a brazing material are superposed, or a core material, a brazing material, and a sacrificial anode material are superposed, and thereafter hot rolling and cold rolling are performed. In hot rolling, the materials are rolled to a laminated sheet at 400° C. to 550° C., and thereafter the laminated sheet is processed to a thickness of 2 mm to 3 mm by hot rolling. In cold rolling, the sheet is subjected to cold rolling a plurality of times, and processed to a predetermined thickness of the aluminum alloy brazing sheet.

In the method for manufacturing the aluminum alloy brazing sheet according to the present invention, intermediate annealing or final annealing is performed between cold rolling and cold rolling, or after the final cold rolling.

In the method for manufacturing the aluminum alloy brazing sheet according to the present invention, in intermediate annealing or final annealing, the sheet is heated at 250° C. to 450° C. in an atmosphere with an oxygen concentration controlled to 1,000 ppm or lower and a dew point controlled to −20° C. or lower, to perform intermediate annealing or final annealing, and the sheet is removed from a furnace at 250° C. or lower. Because the intermediate annealing or the final annealing is a high-temperature process, and provides a large influence on the state of the oxide film. The atmosphere of the intermediate annealing or the final annealing is an inert gas atmosphere, such as nitrogen gas and argon gas. Intermediate annealing or final annealing is performed in an atmosphere with an oxygen concentration controlled to 1,000 ppm or lower and a dew point controlled to −20° C. or lower, and thereafter the sheet is removed from the furnace at 250° C. or lower. This structure enables easy acquisition of a brazing sheet with a surface on which oxide particles including X atoms and having a volume change ratio of 0.99 or lower with respect to the oxide film before brazing heating is formed by brazing heating. When the oxygen concentration in the atmosphere in intermediate annealing or final annealing exceeds 1,000 ppm, growth of the oxide film is promoted, and the concentration of the X atoms in the oxide film is easily increased. When the dew point of the atmosphere in intermediate annealing or final annealing exceeds −20° C., a hydroxide film is easily formed, and the oxide film is easily thickened. When the temperature at which the sheet is removed from the furnace exceeds 250° C., reaction between oxygen or moisture in the air and the surface of the material easily occurs. The annealing time in intermediate annealing or final annealing is preferably one hour or longer.

The aluminum alloy brazing sheet according to the present invention is used for brazing in an inert gas atmosphere without using flux. The brazing temperature in brazing is 580° C. to 615° C.

The aluminum alloy brazing sheet according to the present invention is subjected to brazing heating in an inert gas atmosphere without using flux, to form oxide particles including X atoms and having the volume change ratio of 0.99 or lower with respect to the oxide film before brazing heating on the surface. This structure causes easy exposure of a newly formed surface of the brazing material, and produces excellent brazability.

The aluminum alloy sheet (A) according to the present invention is aluminum alloy sheet obtained by subjecting the aluminum alloy brazing sheet according to the present invention to brazing heating at 580° C. to 615° C. in an inert gas atmosphere without using flux, and oxide particles including X atoms and having the volume change ratio of 0.99 or lower with respect to the oxide film of the aluminum alloy brazing sheet before brazing heating are formed on the surface of the aluminum alloy sheet. Because the oxide including X atoms and formed on the surface of the aluminum alloy sheet (A) according to the present invention is particulate and has the volume change ratio of 0.99 or lower with respect to the oxide film of the aluminum alloy brazing sheet before brazing heating, a newly formed surface of the aluminum alloy appears in part of the surface. Examples of the inert gas include nitrogen gas and argon gas. The oxygen concentration of the atmosphere is 1 ppm to 100 ppm, and preferably 1 ppm to 50 ppm. The dew point is −20° C. or lower, and preferably −40° C. or lower.

The aluminum alloy sheet (A) according to the present invention is an aluminum alloy sheet after the aluminum alloy brazing sheet is brazed.

The heat exchanger according to the present invention is a heat exchanger obtained by subjecting the aluminum alloy brazing sheet according to the present invention to brazing heating in an inert gas atmosphere without using flux, in which oxide particles including X atoms and having the volume change ratio of 0.99 or lower with respect to the oxide film of the aluminum alloy brazing sheet before brazing heating are formed on the surface of the aluminum alloy sheet after being subjected to brazing heating in the heat exchanger.

The heat exchanger according to the present invention is a heat exchanger obtained by using the aluminum alloy sheet of the present invention as an aluminum alloy brazing sheet for manufacturing a heat exchanger, that is, shaping the aluminum alloy sheet according to the present invention into a shape of a component for which the brazing sheet in the heat exchanger is used, assembling the aluminum alloy brazing sheet according to the present invention with another component to be brazed, and performing brazing heating in an inert gas atmosphere. The brazing temperature is 580° C. to 615° C., and the inert gas is nitrogen gas, or argon gas or the like. The oxygen concentration of the atmosphere is 1 ppm to 100 ppm, and preferably 1 ppm to 50 ppm, and the dew point is −20° C. or lower, and preferably −40° C. or lower. Examples of another component brazed together with the aluminum alloy brazing sheet of the present invention include a tube, a header, a fin, and an inlet/outlet pipe, and the like.

In the heat exchanger according to the present invention, oxide particles including X atoms and having the volume change ratio of 0.99 or lower with respect to the oxide film of the aluminum alloy brazing sheet (aluminum alloy brazing sheet of the present invention) before brazing heating are formed on the surface of the aluminum alloy sheet (aluminum alloy sheet (A)) after the aluminum alloy brazing sheet is subjected to brazing heating.

Examples

The following is an explanation of examples of the present invention in comparison with comparative examples, to demonstrate the effect of the present invention. These examples illustrate an embodiment of the present invention, and the present invention is not limited thereto.

The brazing material, the sacrificial anode material, and the core material having the compositions described in Table 1 and Table 2 were casted into ingots by continuous casting. With respect to the core material, each of the obtained ingots was machined to a size with a length of 163 mm and a width of 163 mm, and a thickness of 27 mm for the core material cladded with only the brazing material, and a thickness of 25.5 mm for the core material cladded with the brazing material and the sacrificial anode material. With respect to the brazing material, each of the obtained ingots was subjected to hot rolling at 500° C. to a thickness of 3 mm. Thereafter, each of the ingots was cooled, and cut into a size with a length of 163 mm, and a width of 163 mm. With respect to the sacrificial anode material, each of the obtained ingots was subjected to hot rolling at 500° C. to a thickness of 3 mm, and to cold rolling to a thickness of 1.5 mm, and cut to a size with a length of 163 mm and a width of 163 mm.

TABLE 1

| Material | Alloy Composition (mass %) | | | | | | | | | | | | |
|---|---|---|---|---|---|---|---|---|---|---|---|---|---|
| No. | Si | Fe | Mg | Li | Be | Ca | Ce | La | Y | Zr | Bi | Zn | Ba |
| A1 | 4 | 0.3 | 0.02 | — | — | — | — | — | — | — | — | — | — |
| A2 | 13 | 0.3 | 0.02 | — | — | — | — | — | — | — | — | — | — |
| A3 | 10 | 0.3 | 0.001 | — | — | — | — | — | — | — | — | — | — |
| A4 | 10 | 0.3 | 0.03 | — | — | — | — | — | — | — | — | — | — |
| A5 | 10 | 0.3 | — | 0.02 | — | — | — | — | — | — | — | — | — |
| A6 | 10 | 0.3 | — | — | 0.01 | — | — | — | — | — | — | — | — |
| A7 | 10 | 0.3 | — | — | — | 0.02 | — | — | — | — | — | — | — |
| A8 | 10 | 0.3 | — | — | — | — | 0.01 | — | — | — | — | — | — |
| A9 | 10 | 0.3 | — | — | — | — | — | 0.02 | — | — | — | — | — |
| A10 | 10 | 0.3 | — | — | — | — | — | — | 0.02 | — | — | — | — |
| A11 | 10 | 0.3 | — | — | — | — | — | — | — | 0.01 | — | — | — |
| A12 | 10 | 0.3 | 0.01 | — | — | — | — | — | — | — | 0.004 | — | — |
| A13 | 10 | 0.3 | 0.01 | — | — | — | — | — | — | — | 0.2 | — | — |
| A14 | 10 | 0.3 | 0.01 | 0.01 | — | — | — | — | — | — | 0.05 | — | — |
| A15 | 10 | 0.3 | — | — | 0.01 | 0.01 | — | — | 0.01 | — | 0.05 | — | — |
| A16 | 10 | 0.3 | — | — | — | — | 0.01 | 0.01 | — | — | 0.05 | — | — |
| A17 | 10 | 0.3 | — | — | — | — | — | — | — | — | — | — | — |
| A18 | 10 | 0.3 | — | — | — | — | — | — | — | — | 0.004 | — | — |
| A19 | 10 | 0.3 | — | — | — | — | — | — | — | — | 0.2 | — | — |
| A20 | 10 | 0.3 | — | — | — | — | — | — | — | — | 0.05 | — | — |
| A21 | — | — | — | — | — | — | — | — | — | — | — | 2.5 | — |
| A22 | 3 | 0.3 | 0.02 | — | — | — | — | — | — | — | — | — | — |
| A23 | 16 | 0.3 | 0.02 | — | — | — | — | — | — | — | — | — | — |
| A24 | 10 | 0.3 | 0.0005 | — | — | — | — | — | — | — | — | — | — |
| A25 | 10 | 0.3 | 0.05 | — | 3 | — | — | — | — | — | — | — | — |
| A26 | 10 | 0.3 | — | — | — | — | — | — | — | — | 0.05 | — | 0.02 |
| A27 | 10 | 0.3 | 0.01 | — | — | — | — | — | — | — | 0.3 | — | — |
| A28 | 10 | 0.3 | — | — | — | — | — | — | — | — | 0.3 | — | — |
| A29 | — | — | — | — | — | — | — | — | — | — | — | 6 | — |

TABLE 2

| Material No. | Alloy Composition (mass %) | | | | | | | | | | | | |
|---|---|---|---|---|---|---|---|---|---|---|---|---|---|
| | Si | Fe | Cu | Mn | Mg | Li | Be | Ca | Ce | La | Y | Zr | Ba |
| B1 | — | — | — | — | — | — | — | — | — | — | — | — | — |
| B2 | 0.2 | 0.5 | 0.2 | 1.2 | — | — | — | — | — | — | — | — | — |
| B3 | 0.2 | 0.5 | 0.2 | 1.2 | 0.01 | — | — | — | — | — | — | — | — |
| B4 | 0.2 | 0.5 | 0.2 | 1.2 | 2.0 | — | — | — | — | — | — | — | — |
| B5 | 0.2 | 0.5 | 0.2 | 1.2 | 0.6 | — | — | — | — | — | — | — | — |
| B6 | 0.2 | 0.5 | 0.2 | 1.2 | — | 0.2 | — | — | — | — | — | — | — |
| B7 | 0.2 | 0.5 | 0.2 | 1.2 | — | — | 0.2 | — | — | — | — | — | — |
| B8 | 0.2 | 0.5 | 0.2 | 1.2 | — | — | — | 0.8 | — | — | — | — | — |
| B9 | 0.2 | 0.5 | 0.2 | 1.2 | — | — | — | — | 1.2 | — | — | — | — |
| B10 | 0.2 | 0.5 | 0.2 | 1.2 | — | — | — | — | — | 0.6 | — | — | — |
| B11 | 0.2 | 0.5 | 0.2 | 1.2 | — | — | — | — | — | — | 0.5 | — | — |
| B12 | 0.2 | 0.5 | 0.2 | 1.2 | — | — | — | — | — | — | — | 1.5 | — |
| B13 | 0.2 | 0.5 | 0.2 | 1.2 | 0.3 | 0.2 | — | — | — | — | — | — | — |
| B14 | 0.2 | 0.5 | 0.2 | 1.2 | — | — | 0.2 | — | 0.2 | — | 0.2 | — | — |
| B15 | 0.2 | 0.5 | 0.2 | 1.2 | — | — | — | 0.3 | — | 0.3 | — | — | — |
| B16 | 0.2 | 0.5 | 0.2 | 1.2 | 0.005 | — | — | — | — | — | — | — | — |
| B17 | 0.2 | 0.5 | 0.2 | 1.2 | 2.2 | — | — | — | — | — | — | — | — |
| B18 | 0.2 | 0.5 | 0.2 | 1.2 | — | — | — | — | — | — | — | — | 1.1 |

For the materials in which only the brazing material is used for cladding, a prepared brazing material and a core material were superposed and subjected to hot rolling and cold rolling to a thickness of 0.4 mm. Thereafter, final annealing was performed under the conditions listed in Table 3 to obtain annealed clad sheet materials. For the materials in which the brazing material and the sacrificial anode material were used for cladding, a prepared brazing material, a core material, and a sacrificial anode material were superposed and subjected to hot rolling and cold rolling to a thickness of 0.4 mm. Thereafter, final annealing was performed under the conditions listed in Table 4 to obtain annealed clad sheet materials. The obtained clad sheet materials were used as test materials.

The thickness of the oxide film of each of the test materials was measured by glow discharge-optical emission spectrometry (GD-OES). Spectrometry was performed in the depth direction from the surface of the material by GD-OES, and a position of the measured peak half-value width of oxygen atoms was defined as the thickness of the oxide film. The molar ratio (X atoms/Al) of each of the X atoms with respect to the aluminum in the oxide film in terms of atoms was also analyzed by GD-OES.

Each of the test materials was pressed into a cup shape, subjected to only degreasing with acetone, and assembled into a cup test piece illustrated in FIG. 1. Fins obtained by molding and degreasing a 3003 alloy sheet material with a thickness of 0.1 mm were disposed inside each of the cup test pieces. Each of the cut test pieces was subjected to brazing heating in a nitrogen gas furnace without using flux, to perform braze-jointing. The nitrogen gas furnace was double-chambered experimental furnace, the oxygen concentration during increase in temperature was 100 ppm, and the dew point was −20° C. The oxygen concentration in brazing was 10 ppm to 15 ppm, and the dew point was −40° C. The attainment temperature of each of the test pieces was set to 600° C.

For the outside, the fillet formed on the external side of the flare joint was visually evaluated with five levels, that is, A: a fillet of uniform size is continuously formed; B: the state in which a uniform fillet is formed by 80% or more, and no break of a fillet exists, although the fillet size fluctuates; C: the state in which a uniform fillet is formed by 40% or more, and no break of the fillet exists, although the fillet size fluctuates; D: the state in which the fillet is partly broken and discontinuous, or the part in which the fillet size is uniform is less than 40%; and E: unjoined state in which a fillet is hardly formed or is not formed. Among the levels, levels A to C were determined as passing levels. For the inside, the brazed test piece was divided into two, and the fillet formation state was visually evaluated with the five levels as described above, for the joined part between the inside of the flare joint and the fins.

The volume change ratio of the oxide particles including X atoms and formed after brazing with respect to the oxide film before brazing heating was obtained as follows. First, the crystalline structure of the formed oxide particles including X atoms was specified by X-ray diffraction for thin film, thereafter the molecular weight of the oxide was divided by the density described in the publicly known literature, to determine the volume per oxygen atom, and the volume per oxygen atom was divided by the volume per oxygen atom of the oxide film before brazing heating. In X-ray diffraction for thin film, measurement was performed at an incident angle of 1°. With respect to the volume per oxygen atom of the oxide film before brazing heating, the film component was $Al_2O_3$, and the density thereof was assumed to be 3.0 $g/cm^3$.

TABLE 3

| | Annealing Conditions | | |
|---|---|---|---|
| Condition No. | Oxygen Concentration in atmosphere (ppm) | Dew Point in atmosphere (° C.) | Furnace Removal Temperature (° C.) |
| C1 | 500 | −30 | 220 |
| C2 | 1,000 | −30 | 220 |
| C3 | 1,000 | −20 | 220 |
| C4 | 1,000 | −20 | 250 |
| C5 | 2,000 | −30 | 220 |
| C6 | 500 | 0 | 220 |
| C7 | 500 | −30 | 280 |

Examples

Figure 2:
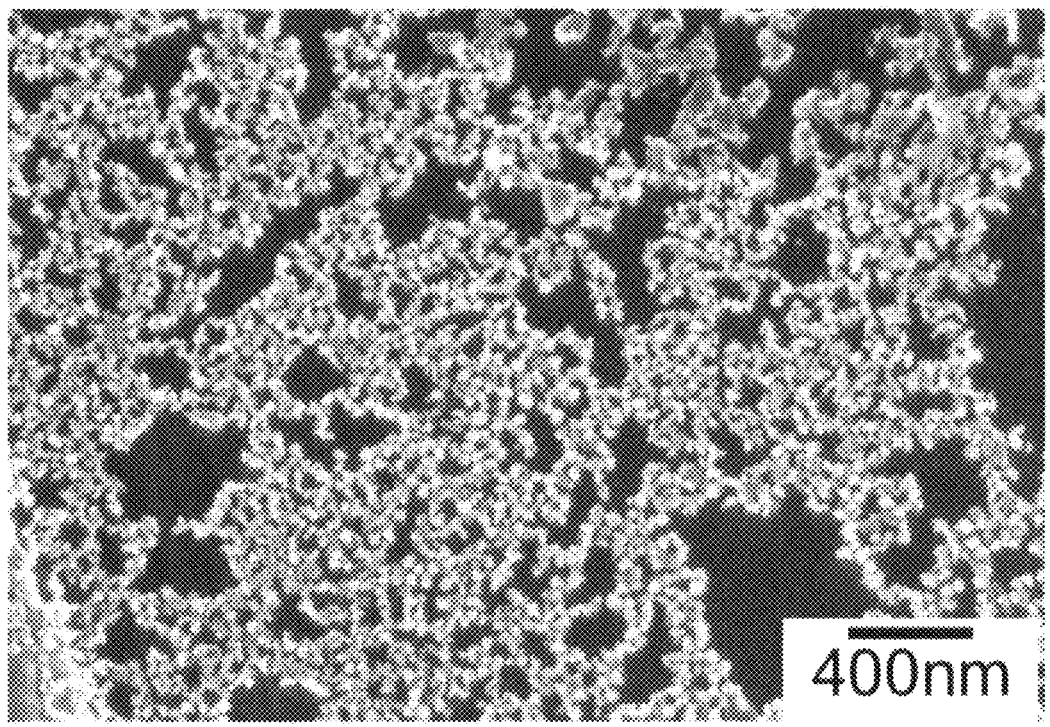
FIG. 2 is an SEM photograph of a surface of a test material of test No. 30 of the example after brazing heating.

Clad sheet materials were prepared with combinations of the brazing materials, the core materials, and the sacrificial anode material listed in Table 4, and the obtained clad sheet materials were analyzed and subjected to brazability performance test. Table 4 lists the results of the test. FIG. 2 illustrates an SEM photograph (magnification of 30,000) of the surface of the test No. 30. In the SEM photograph, particles looking like white spots are oxide particles including X atoms, and black flat surfaces are newly formed surfaces generated on the surface of the brazing material in brazing heating.

Comparative Examples

Clad sheet materials were prepared with combinations of the brazing materials, the core materials, and the sacrificial anode material listed in Table 5, and the obtained clad sheet materials were analyzed and subjected to brazability performance test. Table 5 lists the results of the test.

Because the test material 34 included a high Si content of the brazing material, cracks occurred in rolling of the material, and no analysis or performance test was able to be performed. In the test pieces 39 and 40, the surface of the brazing material after brazing was blackened. In the test material 42, corrosion of the molten brazing material progressed, and the test piece after brazing was deformed. Because the test material 43 included a high Zn content of the brazing material, cracks occurred in rolling of the material, and no analysis or performance test was able to be performed.

TABLE 4

| No. | Brazing Material | Core Material | Sacrificial material | Annealing Condition | Molar ratio of X atoms to Al in Oxide film X/Al | Thickness of oxide film (nm) | Volume change ratio (type of oxide particles) | Brazability Inside | Brazability Outside |
|---|---|---|---|---|---|---|---|---|---|
| 1 | A1 | B1 | — | C1 | Mg: 0.09 | 10 | 0.863 ($MgAl_2O_4$) | C | C |
| 2 | A2 | B2 | — | C1 | Mg: 0.09 | 10 | 0.863 ($MgAl_2O_4$) | A | B |
| 3 | A3 | B2 | — | C2 | Mg 0.01 | 10 | 0.863 ($MgAl_2O_4$) | C | C |
| 4 | A4 | B2 | — | C1 | Mg: 0.20 | 30 | 0.863 ($MgAl_2O_4$) | B | C |
| 5 | A5 | B2 | — | C2 | Li: 0.14 | 20 | 0.822 ($LiAl_5O_8$) | B | B |
| 6 | A6 | B2 | — | C2 | Be: 0.08 | 10 | 0.763 ($BeAl_2O_4$) | B | B |
| 7 | A7 | B2 | — | C2 | Ca: 0.04 | 10 | 0.967 ($CaAl_{12}O_{19}$) | B | C |
| 8 | A8 | B2 | — | C2 | Ce: 0.04 | 10 | 0.957 ($CeAlO_3$) | B | C |
| 9 | A9 | B2 | — | C2 | La: 0.02 | 10 | 0.965 ($LaAlO_3$) | B | C |
| 10 | A10 | B2 | — | C2 | Y: 0.01 | 10 | 0.960 ($Y_3Al_5O_{12}$) | B | C |
| 11 | A11 | B2 | — | C2 | Zr: 0.01 | 10 | 0.947 ($ZrO_2$) | B | C |
| 12 | A12 | B2 | — | C1 | Mg: 0.09 | 10 | 0.863 ($MgAl_2O_4$) | A | C |
| 13 | A13 | B2 | — | C1 | Mg: 0.09 | 10 | 0.863 ($MgAl_2O_4$) | A | B |
| 14 | A14 | B2 | — | C1 | Mg: 0.11 Li: 0.11 | 10 | 0.863 ($MgAl_2O_4$) 0.822 ($LiAl_5O_8$) | A | B |
| 15 | A15 | B2 | — | C1 | Be: 0.09 Ca: 0.05 Y: 0.02 | 10 | 0.763 ($BeAl_2O_4$) 0.967 ($CaAl_{12}O_{19}$) 0.960 ($Y_3Al_5O_{12}$) | A | B |
| 16 | A16 | B2 | — | C1 | Ce: 0.05 La: 0.03 | 10 | 0.957 ($CeAlO_3$) 0.965 ($LaAlO_3$) | A | B |
| 17 | A17 | B3 | — | C3 | Mg: <0.01 | 10 | 0.863 ($MgAl_2O_4$) | C | C |
| 18 | A18 | B4 | — | C2 | Mg: 0.02 | 10 | 0.863 ($MgAl_2O_4$) | B | B |
| 19 | A19 | B5 | — | C3 | Mg: 0.01 | 10 | 0.863 ($MgAl_2O_4$) | A | C |
| 20 | A20 | B6 | — | C4 | Li: 0.01 | 10 | 0.822 ($LiAl_5O_8$) | A | B |
| 21 | A20 | B7 | — | C4 | Be: <0.01 | 10 | 0.763 ($BeAl_2O_4$) | A | B |
| 22 | A20 | B8 | — | C4 | Ca: <0.01 | 10 | 0.967 ($CaAl_{12}O_{19}$) | A | B |
| 23 | A20 | B9 | — | C4 | Ce: <0.01 | 10 | 0.957 ($CeAlO_3$) | A | B |

TABLE 4-continued

| No. | Brazing Material | Core Material | Sacrificial material | Annealing Condition | Molar ratio of X atoms to Al in Oxide film X/Al | Thickness of oxide film (nm) | Volume change ratio (type of oxide particles) | Brazability Inside | Brazability Outside |
|---|---|---|---|---|---|---|---|---|---|
| 24 | A20 | B10 | — | C4 | La: <0.01 | 10 | 0.965 (LaAlO$_3$) | A | B |
| 25 | A20 | B11 | — | C4 | Y: <0.01 | 10 | 0.960 (Y$_3$Al$_5$O$_{12}$) | A | B |
| 26 | A20 | B12 | — | C4 | Zr: <0.01 | 10 | 0.947 (ZrO$_2$) | A | B |
| 27 | A20 | B13 | — | C4 | Mg: 0.01 Li: 0.01 | 10 | 0.863 (MgAl$_2$O$_4$) 0.822 (LiAl$_5$O$_8$) | A | A |
| 28 | A20 | B14 | — | C4 | Be: <0.01 Ca: <0.01 Y: <0.01 | 10 | 0.763 (BeAl$_2$O$_4$) 0.967 (CaAl$_{12}$O$_{19}$) 0.960 (Y$_3$Al$_5$O$_{12}$) | A | B |
| 29 | A20 | B15 | — | C4 | Ce: <0.01 La: <0.01 | 10 | 0.957 (CeAlO$_3$) 0.965 (LaAlO$_3$) | A | B |
| 30 | A20 | B5 | A21 | C4 | Mg: 0.02 | 10 | 0.863 (MgAl$_2$O$_4$) | A | A |
| 31 | A3 | B3 | — | C1 | Mg: 0.02 | 10 | 0.863 (MgAl$_2$O$_4$) | B | B |
| 32 | A5 | B5 | — | C1 | Mg: 0.01 Li: 0.14 | 10 | 0.863 (MgAl$_2$O$_4$) 0.822 (LiAl$_5$O$_8$) | A | A |

TABLE 5

| No. | Brazing Material | Core Material | Sacrificial material | Annealing Condition | Molar ratio of X atoms to Al in Oxide film X/Al | Thickness of oxide film (nm) | Volume change ratio | Brazability Inside | Brazability Outside |
|---|---|---|---|---|---|---|---|---|---|
| 33 | A22 | B2 | — | C1 | Mg: 0.09 | 10 | 0.863 (MgAl$_2$O$_4$) | E | E |
| 34 | A23 | B2 | — | Difficult to manufacture clad material | | | | | |
| 35 | A24 | B2 | — | C4 | Mg: <0.01 | 10 | 0.863 (MgAl$_2$O$_4$) | E | E |
| 36 | A25 | B2 | — | C1 | Mg: 0.3 | 30 | 0.994 (MgO) | C | D |
| 37 | A26 | B2 | — | C1 | Ba: 0.05 | 10 | 1.377 (BaAl$_2$O$_4$) | D | E |
| 38 | A20 | B18 | — | C2 | Ba: <0.01 | 10 | 1.377 (BaAl$_2$O$_4$) | D | E |
| 39 | A27 | B2 | — | C1 | Mg: 0.09 | 10 | 0.863 (MgAl$_2$O$_4$) | D | E |
| 40 | A28 | B5 | — | C1 | Mg: <0.01 | 10 | 0.863 (MgAl$_2$O$_4$) | C | E |
| 41 | A20 | B16 | — | C1 | Mg: <0.01 | 10 | 0.863 (MgAl$_2$O$_4$) | E | E |
| 42 | A20 | B17 | — | C1 | Mg: 0.03 | 10 | 0.863 (MgAl$_2$O$_4$) | C | E |
| 43 | A20 | B5 | A29 | Difficult to manufacture clad material | | | | | |
| 44 | A20 | B5 | — | C5 | Mg: 0.3 | 20 | 0.994 (MgO) | C | D |
| 45 | A20 | B5 | — | C6 | Mg: 0.2 | 60 | 0.994 (MgO) | D | E |
| 46 | A20 | B5 | — | C7 | Mg: 0.3 | 40 | 0.994 (MgO) | C | D |

The invention claimed is:

1. An aluminum alloy brazing sheet used for brazing in an inert gas atmosphere without using flux, the aluminum alloy brazing sheet comprising:
   a core material of aluminum or aluminum alloy; and
   a brazing material of aluminum alloy including Si of 4.0 mass % to 13.0 mass % and cladding one side surface or both side surfaces of the core material, wherein
   one or both of the core material and the brazing material includes any one or two or more types of X atoms, X being selected from the group consisting of Li, Be, Ca, Ce, La, Y, and Zr,
   when only the core material includes the X atoms, a content of each of the X atoms in the core material is 0.01 mass % to 2.0 mass %,
   when only the brazing material includes the X atoms, a content of each of the X atoms in the brazing material is 0.001 mass % to 0.03 mass %,
   when both the core material and the brazing material include the X atoms, a content of each of the X atoms in the core material is 0.01 mass % to 2.0 mass %, and a content of each of the X atoms in the brazing material is 0.001 mass % to 0.03 mass %,
   an oxide film formed on a surface of the brazing material by brazing such that each of the X atoms in the oxide film has a molar ratio of 0.2 or lower with respect to Al in the oxide film, thereby leading to a volume change ratio of 0.99 or lower, wherein the volume change ratio is a volume per oxygen atom of oxide particles after brazing over volume per oxygen atom of the oxide particles before brazing.

2. The aluminum alloy brazing sheet according to claim 1, wherein the oxide film formed on the surface of the aluminum alloy brazing sheet has a thickness of 30 nm or less.

3. The aluminum alloy brazing sheet according to claim 1, wherein the core material is aluminum alloy including:
   the X atoms in which a content of each type of the X atoms is 2.0 mass % or lower; and
   any one or two or more types of Mn of 1.8 mass % or lower, Si of 1.2 mass % or lower, Fe of 1.0 mass % or lower, Cu of 1.5 mass % or lower, Zn of 3.0 mass % or lower, and Ti of 0.2 mass % or lower, with the balance being Al and inevitable impurities.

4. The aluminum alloy brazing sheet according to claim 1, wherein the brazing material is aluminum alloy including:
   Si of 4.0 mass % to 13.0 mass %; and
   the X atoms in which a content of each type of the X atoms is 0.03 mass % or lower, with the balance being Al and inevitable impurities.

5. The aluminum alloy brazing sheet according to claim 1, wherein the brazing material is aluminum alloy further including Bi of 0.004 mass % to 0.2 mass %.

6. The aluminum alloy brazing sheet according to claim 1, wherein the brazing material dads one side surface, a sacrificial anode material dads the other side surface, and the sacrificial anode material is formed of aluminum alloy including Zn of 0.9 mass % to 6.0 mass % with the balance being Al and inevitable impurities.

* * * * *